(12) United States Patent
Huckerby (10) Patent No.: US 11,883,927 B2
(45) Date of Patent: Jan. 30, 2024

(54) METHOD OF MACHINING A COMPONENT

(71) Applicant: ROLLS-ROYCE plc, London (GB)

(72) Inventor: Karl S. Huckerby, Derby (GB)

(73) Assignee: Rolls-Royce PLC, London (GB)

( * ) Notice: Subject to any disclaimer, the term of this patent is extended or adjusted under 35 U.S.C. 154(b) by 372 days.

(21) Appl. No.: 17/220,318

(22) Filed: Apr. 1, 2021

(65) Prior Publication Data

US 2021/0347008 A1 Nov. 11, 2021

(30) Foreign Application Priority Data

May 7, 2020 (GB) ...................................... 2006769

(51) Int. Cl.
*B24B 51/00* (2006.01)
*B24B 7/10* (2006.01)
(Continued)

(52) U.S. Cl.
CPC ................ *B24B 51/00* (2013.01); *B24B 7/10* (2013.01); *G05B 19/4097* (2013.01);
(Continued)

(58) Field of Classification Search
CPC ....... B24B 51/00; B24B 7/10; G05B 19/4097; G05B 15/02; G05B 2219/32228; G05B 2219/37047; G05B 2219/45147
See application file for complete search history.

(56) References Cited

U.S. PATENT DOCUMENTS 6,748,112 B1 * 6/2004 Nguyen .................... G06T 7/30
382/209
2004/0083024 A1 * 4/2004 Wang ...................... B23K 26/32
700/195
(Continued)

FOREIGN PATENT DOCUMENTS

EP 2070641 A2 6/2009
EP 2254728 A2 12/2010
(Continued)

OTHER PUBLICATIONS

Great Britain search report dated Nov. 5, 2020, issued in GB Patent Application No. 2006769.0.
(Continued)

*Primary Examiner* — Thomas C Lee
*Assistant Examiner* — Ameir Myers (57) ABSTRACT

A method of machining a surface of a component. The method comprises scanning the surface of the component to obtain scanned electronic 3D data representing the scanned surface of the component locating a surface defect of the scanned surface and identifying a defect region that surrounds and includes the surface defect, and providing electronic 3D data representing a patch having the desired shape of the defect region. The method also comprises transforming the patch to generate a tooling path for repairing the surface defect. The transformation comprising translating a plurality of nodes of the patch. The translation distance of each node based on the distance of that node from an origin node of the patch. The method further comprises machining the surface of the component according to the generated tooling path.

15 Claims, 5 Drawing Sheets

(51) Int. Cl.
*G05B 15/02* (2006.01)
*G05B 19/4097* (2006.01)

(52) U.S. Cl.
CPC .... *G05B 15/02* (2013.01); *G05B 2219/32228* (2013.01); *G05B 2219/37047* (2013.01); *G05B 2219/45147* (2013.01)

(56) References Cited

U.S. PATENT DOCUMENTS

| | | | |
|---|---|---|---|
| 2009/0144980 A1* | 6/2009 | Rangarajan | G05B 19/4097 29/889.1 |
| 2010/0095526 A1 | 4/2010 | Derrien et al. | |
| 2016/0075028 A1* | 3/2016 | Bain | B25J 9/1684 901/41 |
| 2021/0302937 A1* | 9/2021 | Ridgeway | B23Q 35/10 |

FOREIGN PATENT DOCUMENTS

| | | |
|---|---|---|
| EP | 2286956 A1 | 2/2011 |
| EP | 2317076 A2 | 5/2011 |
| EP | 3144760 A1 | 3/2017 |
| EP | 3242177 A1 | 11/2017 |
| WO | 2009105221 A2 | 8/2009 |

OTHER PUBLICATIONS

European search report dated Sep. 27, 2021, issued in EP Patent Application No. 21168252.

* cited by examiner

METHOD OF MACHINING A COMPONENT

CROSS-REFERENCE TO RELATED APPLICATIONS

This specification is based upon and claims the benefit of priority from UK Patent Application Number GB2006769.0 filed on 7 May 2020, the entire contents of which are incorporated herein by reference.

BACKGROUND

Technical Field

The present disclosure provides a method of machining a surface of a component as set out in the appended claims. In particular, the method may form part of a process for repairing or finishing of a component such as an aerofoil (e.g. a turbine or compressor blade for a gas turbine engine).

Description of the Related Art

Machines often rely on the integrity of their components in order to operate in an efficient and safe manner. Thus, maintenance and repair of components, which may be damaged during operation of the machine, are important in the continued operation of the machine.

For example, gas turbine engines comprise a number of precision-engineered components, the geometry of which must be maintained in order to ensure continued optimal operation. Gas turbine components can be subject to wear, impact, handling damage, corrosion and/or cracking. These may occur throughout the operational life of the component, or can occur due to manufacturing issues.

Finishing belts are typically used to polish nicks and dents away from components (such as compressor and turbine blades). In general, this involves detecting the defect by visual inspection and hand polishing the defect to remove the defect from the component. Thus, the process is manually driven and susceptible to variation dependent on the skill of the operator.

This process has a number of shortcomings. Due to the manual nature of the process, the shape can only be roughly shaped by the operator to be smooth and continuous. This results in inconsistency between repairs (i.e. the repairs are not repeatable). As repairs are judged visually, the effectiveness of the repair is based on the experience and skill of the operator, which inevitably results in some non-optimal repairs being performed. Further, the use of vibrating equipment by operators in order to perform the repair can result in health and safety issues for the operators, such as vibration white finger (VWF).

Hence, there is a need to address at least some of the issues present in the so current processes for repairing or finishing components.

SUMMARY

According to a first aspect there is provided a method of machining a surface of a component, the method comprising:

scanning the surface of the component to obtain scanned electronic 3D data representing the scanned surface of the component;

locating a surface defect of the scanned surface and identifying a defect region that surrounds and includes the surface defect;

providing electronic 3D data representing a patch having the desired shape of the defect region;

transforming the patch to generate a tooling path for repairing the surface defect, transforming the patch comprising translating a plurality of nodes of the patch, the translation distance of each node based on the distance of that node from an origin node of the patch; and machining the surface of the component according to the generated tooling path.

This method may allow repair of a component that may be automated (e.g. computer controlled) and may thus avoid a number of issues that can occur due to human intervention in the process of repairing a component. Thus, for example, the method may provide repairs that are more repeatable and more accurate than those performed by a human operator. Further, the use of e.g. a computer controlled robot instead of a human operator for such operations avoids the risk of operators acquiring VWF, which can result from extended use of vibrating hand-held equipment. In addition, the method provides for an improvement to the smoothness of the finish on the repaired surface, both in the immediate area where the damage to the surface had occurred and in the transition region between the repaired surface and the unaffected surface regions of the component.

In general, the method may be considered an adaptive machining method, because it allows repairs to be tailored to specific defects.

The transformation of the patch may be performed such that, for each node, the greater the distance the node is from the origin nodes, the smaller the translation distance is for that node. As will be described further below, the transformation may be performed such that the relationship between distance from the origin node and translation distance is a non-linear relationship.

The patch (i.e. the 3D data representing the patch) may be extracted from data representing the component as designed (e.g. used to design and/or manufacture the component). Thus, for example, the patch may be based on (e.g. may be extracted from) CAD data used in the design and/or manufacture of the component. In other words, the patch may have the shape of the defect region without the defect (i.e. prior to the defect occurring). The patch may alternatively be shaped by an operator (i.e. visually) to conform to the defect region (although this may be less desirable given the benefits of automating this process). The patch may alternatively be shaped by an automated process based on the shape of the region of the surface surrounding the defect.

The nodes of the patch may form an array of nodes. The array of nodes may be arranged in a grid. The size of the patch may be determined based on a depth (e.g. a maximum depth) of the defect. For example, a diameter, width or length of the patch may be a multiple of the depth of the defect. The depth of the defect for determining the size of the patch may be determined in any number of ways and may be an approximate depth. For example, the depth may be determined by aligning a patch of an initial size with the defect region and determining a distance (e.g. a maximum distance) between the patch and the defect region. The size of the initial patch may then be adjusted based on the measured depth. The initial patch could be representative of the shape of the entire surface (or entire component).

The method may comprise selecting an origin node from the plurality of nodes of the patch. The step of selecting the origin node may comprise comparing the patch with the scanned surface (e.g. the defect region of the scanned surface). Thus, for example, the selected origin node may represent a point on the patch having the greatest distance (i.e. deviation) from a corresponding point on the scanned surface (e.g. the deepest point of the defect). Alternatively, the origin node may correspond to a geometrical centre of the defect. The origin node may be a point on the patch that corresponds to the mean location of a distribution of depth of the defect (i.e. the "centre of mass" of the defect).

The method may comprise aligning the patch with the scanned surface (with the defect region of the scanned surface). The step of aligning the patch may comprise selecting a plurality of alignment nodes on the patch (e.g. being a selection of a plurality of nodes of the array of nodes). Alignment may comprise aligning the alignment nodes with the scanned surface (e.g. with the defect region of the scanned surface). Alignment may comprise e.g. minimising the distance between each alignment node and the scanned surface.

The alignment nodes may be selected so as to lie in (or correspond to) an area, when aligned with the scanned surface, that is without damage (i.e. does not contain the defect). Thus, the alignment nodes may be selected so as to surround the defect (i.e. when the patch is aligned with the scanned surface). The alignment nodes may be proximate a boundary of the patch (and/or may be spaced from the centre of the patch).

Alignment with a local region (i.e. the defect region) of the scanned surface rather than the entire scanned surface may allow for closer alignment of the patch with the surface. That is, by providing a patch that is localised to the defect, it may be easier to align the patch with the scanned surface. This is especially the case where the component has undergone global deformation (e.g. twisting of a turbine blade) that would make it problematic to align the entire scanned surface with a corresponding undamaged (e.g. untwisted) surface. Thus, the selection of a region may facilitate a more precise repair of the defect.

The selection of the defect region may be performed as an iterative process. Thus, for example, the defect region identification (e.g. selection) and alignment may be performed in conjunction. In other words, a defect region may be identified and alignment may be performed, then if alignment does not meet a threshold value (e.g. minimum distance is not below a threshold value), a smaller defect region may be selected. This may allow the global deformation (i.e. of the entire component) to be distinguished from local deformation (at the defect region).

The step of locating the defect may comprise inspecting the scanned surface (i.e. inspecting the electronic 3D data representing the scanned surface) for areas having one or more surface characteristics indicative of a surface defect. For example, the step of locating the surface defect may comprise inspecting the scanned surface for regions of high curvature. In other words, the scanned surface (or electronic 3D data representing the scanned surface) may be inspected for regions having a curvature above a predetermined threshold curvature (and such regions may be determined as having a surface defect).

Other surface characteristics may be used to locate the surface defect, such as the roughness of an area or watermark scanning. Thus, for example, the scanned surface may be compared to 3D data representing the component as designed, and a contour map may be produced based on the differences between the 3D data and the scanned surface.

As is set forth above, the translation distance of each node is based on the distance of that node from the origin node. That distance may be a physical distance, or may be a distance that is determined in terms of the number of nodes between the node and the origin node (i.e. where the patch comprises an array/grid of nodes). The translation distance of each node may be at least partly determined based on a two-dimensional Gaussian function. The origin node may be the centre-point of the Gaussian function.

A weighting may be determined, for each node, using the Gaussian function (e.g. and based on the position of the node relative to the origin node). The weighting value may be indicative of the translation distance of the node relative to the translation distance of the origin node. Thus, the weighting value may be used to determine the translation distance for each node. For example, the weightings may decrease with distance from the origin node (such that the origin node may have the highest weighting (e.g. a value of "1")).

The transformation of the patch may be based on the depth of the defect. The depth of the transformed patch may be based on the depth of the defect. The translation distance of the origin node may be based on the depth of the defect corresponding to the origin node (i.e. the distance between the defect surface and the origin node). The translation distance of the origin node may be a multiple of the distance (deviation) between the origin node and the defect (i.e. the point of the defect corresponding to the origin node). In other words, the translation distance may be determined by applying a predetermined depth factor to the "depth" of the origin node (i.e. the distance of the origin node from the defect surface). For example, the translation distance of the origin node may be between 1.1 and 1.5 times (or e.g. approximately 1.3 times) the distance between the origin node (prior to transformation) and the defect surface.

Each weighting (which may be normalised so as to be between 0 and 1) may be multiplied by the translation distance of the origin node in order to determine the translation distance of each node.

In some embodiments, the translation distance of each node may be shifted. For example, each determined translation distance may be reduced by a fixed value. This may have the effect of shifting the transformed patch in an upwards direction (i.e. away from the surface of the component). This may prevent sharp edges being formed at the transition between the machined surface and the unmachined surface after repair.

Each node of the plurality of nodes may be translated in a normal direction (i.e. a direction that is normal to the surface of the patch at the location of the node). Thus, for a substantially planar surface, all of the nodes may be translated in a direction that is perpendicular to the plane of the surface. For arcuate/curved surfaces, the nodes may be translated in radial directions.

The step of scanning the surface of the component may be performed using an optical 3D scanning system, such as a structured light 3D scanner, laser scanning system or a computed tomography (CT) scanner. In general, a wide-area or full-field scanner may be used to perform the scanning step.

The method may comprise, prior to locating the surface defect, splitting the scanned surface into a plurality of scanned surface sub-region. The step of locating the surface defect may be performed on a scanned surface sub-region.

The method may comprise, prior to machining the component, constructing 3D data representing the component with the patch applied (i.e. and the defect removed). This 3D data may be used for analysis of the repair (and its effects on the component). Such analysis may, for example, be functional or aero analysis. The method may further comprise adjusting the generated tool path in response to the analysis.

The machining step may be performed by one or more of a polishing machine, welding machine, hole-drilling apparatus and laser ablation apparatus. The machining may be performed by a robot (i.e. the machining may be performed as an automated process).

The scanning step may be performed with the component mounted on a base element (e.g. base plate). The base element (with the component mounted thereto) may be transferred to a machine for the machining step. In other words, the position of the component may be fixed with respect to the base element, so as to provide a coordinate system (via the base element) that is consistent between the scanning step and the machining step.

The component may be an aerofoil. The component may be a turbine blade. The component may be a compressor blade. The component may otherwise be a stationary vane (e.g. a compressor, turbine or guide vane).

The defect may be e.g. in the form of a dent, nick, weld bead, etc.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
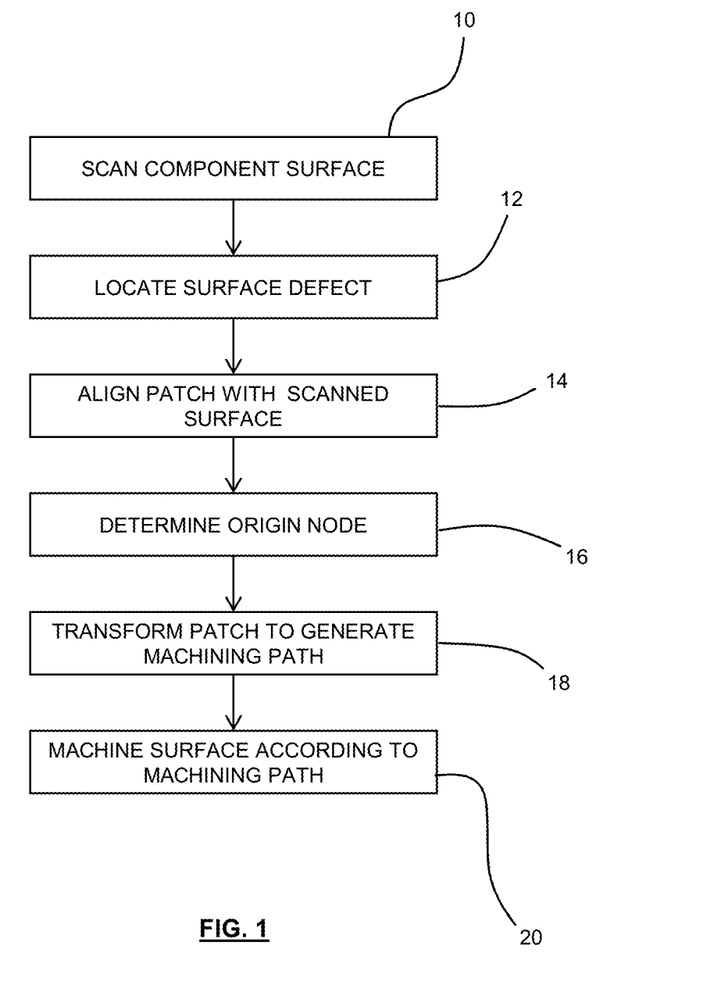
FIG. 1 is a flow chart illustrating a method for repairing a surface of a component.

FIG. 1 provides an overview of a method for repairing a surface of a component having a surface defect.

The method comprises, at step 10, scanning the surface to obtain scanned electronic 3D data representing the scanned surface of the component (e.g. a CAD file representing the surface). In some cases, the surface may be scanned as part of a scan of the entire component. Any suitable scanning method may be used, including e.g. laser scanning and CT scanning.

At step 12, a surface defect is located on the scanned surface. This may be performed by inspecting the scanned surface (i.e. the 3D data representing the scanned surface) for the surface defect. The inspection may comprise identifying regions on the scanned surface that have a curvature above a threshold curvature (which may indicate the presence of a defect in the surface).

Once a defect is located, at step 14, a patch is provided and aligned with the scanned surface. This step first involves identifying (or selecting) a defect region (of the surface) surrounding the defect. This defect region thus includes a portion containing the defect and a portion that is undamaged (i.e. does not contain the defect). The patch is defined by 3D data that is representative of the defect region in an undamaged state (i.e. without the defect). Thus, for example, the patch may be extracted from 3D data (e.g. CAD data) representative of the component as designed (e.g. that may have been used in the design and/or manufacture of the component). In this way, the patch may represent the intended or desired shape of the defect region.

The patch is aligned with the defect region of the scanned surface. The alignment of the patch with the defect region means that the patch can be compared with the defect region and deviation of the scanned surface from the patch (due to the presence of the defect) can be determined. This deviation is used, at step 16, to determine an origin node 52 of the defect. This origin node 52 is generally a central point of the defect or e.g. a "centre of mass" of the defect.

Once the origin node 52 is determined, at step 18, the patch is transformed (based on the origin node) to generate a machining path (e.g. a cutting path). This process will be described in more detail below, but in general terms, the transformation comprises translating a plurality of nodes (or points) of the patch based on the position of those nodes relative to the origin node 52.

At step 20, the machining path is used to control a machining tool to machine the surface of the component in order to remove the defect from the surface of the component.

Figure 2:
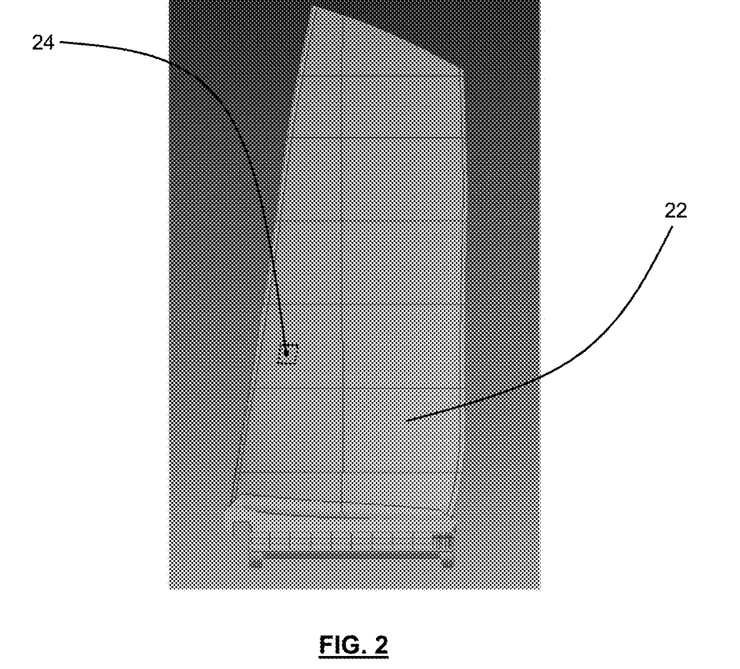
FIG. 2 is a front view of a turbine blade.

FIG. 2 provides a visual representation of 3D data representing a scanned turbine blade 22. The turbine blade 22 comprises a surface defect 24, which in the present embodiment is a dent in a gas-washed surface of the turbine blade 22 and is caused by foreign object damage (FOD) that has occurred during use of the turbine blade 22 as part of a turbine engine.

Figure 3:
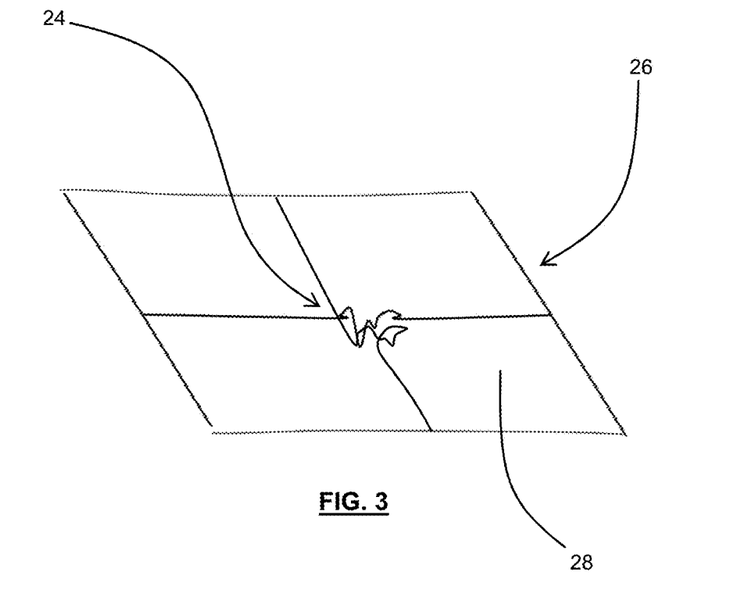
FIG. 3 is a schematic view of a defect region of the turbine blade.

The surface defect 24 is illustrated schematically in FIG. 3. In particular, this figure illustrates a selected region (referred to herein as the defect region 26) of the turbine blade 22 surface that surrounds and includes the surface defect 24. The defect region 26 comprises an undamaged portion 28 that surrounds the defect 24.

Figure 4:
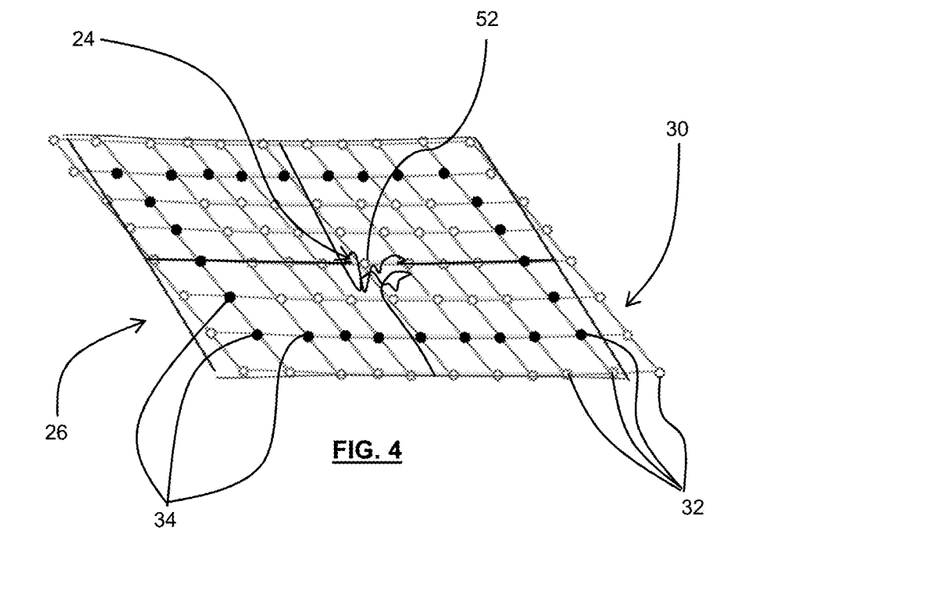
FIG. 4 is a schematic view of the defect region of FIG. 3 with a patch applied.

FIG. 4 illustrates the provision of a patch 30 overlaid over the defect region 26. The patch 30 is extracted from 3D data (i.e. a CAD file) that is representative of the original (or intended) shape of the region (i.e. without the inclusion of the defect). That is, the patch 30 is extracted from data representing the component as designed. In the illustrated embodiment, the patch 30 is a substantially planar rectangle, because of the location of the defect 24 on a substantially planar surface of the turbine blade 22. It should, however, be appreciated that the present method is applicable to non-planar (e.g. curved or complex) geometries.

The patch 30 comprises an 11×8 grid of evenly spaced nodes 32 (i.e. points on the surface of the patch 30). Of course, in other embodiments, other patch sizes/resolutions may be used depending on the nature of the defect. In the illustrated embodiments, a plurality of these nodes 32 have been selected as alignment nodes 34 (shaded in black). The alignment nodes 34 are proximate the periphery of the patch 30 and form a rectangular shape that defines a boundary around the centre of the patch 30. The selection of nodes 32 at the boundary means that, when the patch 30 is aligned with the defect region 26, the alignment nodes 34 align with the undamaged portion 28 of the defect region 26.

The alignment nodes 34 aid in alignment of the patch 30 with the defect region 26. In particular, alignment of the patch 30 with the defect region 26 is performed by minimising the distance between the alignment nodes 34 and the defect region 26. As should be appreciated, exact alignment between the alignment nodes 34 and the defect region 26 may not be possible. For example, where the turbine blade 22 has undergone global twisting (i.e. across the entire length of the turbine blade 22) it may not be possible to achieve exact alignment. Minimising the size of the patch 30 (and the corresponding defect region 26) may, however, help to minimise any misalignment between the patch 30 and the defect region 26. The minimisation may be performed using a fitting algorithm, such as a Gaussian best-fit algorithm applied across the nodes.

Once aligned, the patch 30 is transformed. The patch 30 is shown transformed in FIG. 5 and, as is apparent from this figure, the transformation of the patch 30 is such that it extends below the deepest part of the defect 24 by a distance A. This distance is a multiple of the depth B of the defect 24 formed in the turbine blade 22 surface. For the purposes of this exemplary embodiment, distance A is 33% of distance B, giving a ratio of the depth of the transformed patch 30 to the depth of the defect 24 of 1.33:1.

Figure 5:
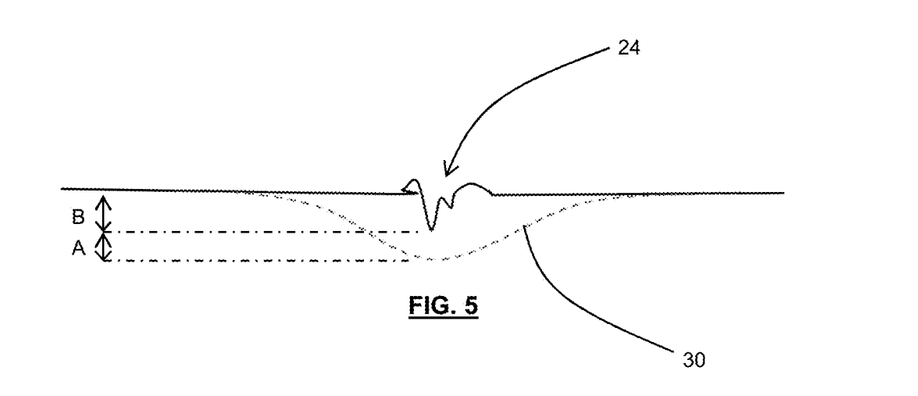
FIG. 5 is a schematic sectional view of the defect region of FIG. 3 and FIG. 4, with the patch transformed.

The patch 30, once transformed, can be used to define a machining path for machining the surface of the turbine blade 22. As should be apparent from the figure, when the turbine blade 22 surface is machined using this machining path, the defect 24 is removed from the turbine blade 22. The transformed patch 30 has a smooth profile such that that is a smooth transition from the point of maximum depth of the patch 30 to the periphery of the patch 30. This minimises (or avoids) discontinuities in the resulting machined surface. This may avoid the presence of stress concentrations in machined surface, and may minimise any negative effects on the aerodynamic performance of the turbine blade 22.

The transformation of the patch 30 is performed by translating (i.e. moving) the nodes 32 of the patch 30. Each node 32 is moved by a translation distance associated with that node 32. Each node 32 is translated in a direction that is normal to the patch 30 surface (i.e. normal to the pre-transformed patch shape, which is representative of the desired shape) at that node 32. In the illustrated embodiment, because the patch 30 is generally horizontal and planar, the nodes 32 are all translated in a generally vertical (and downward) direction. However, for example, with a convex or concave surface, each node would be translated in a different direction to the other (i.e. depending on the surface normal of the desired shape at that node).

Figure 6:
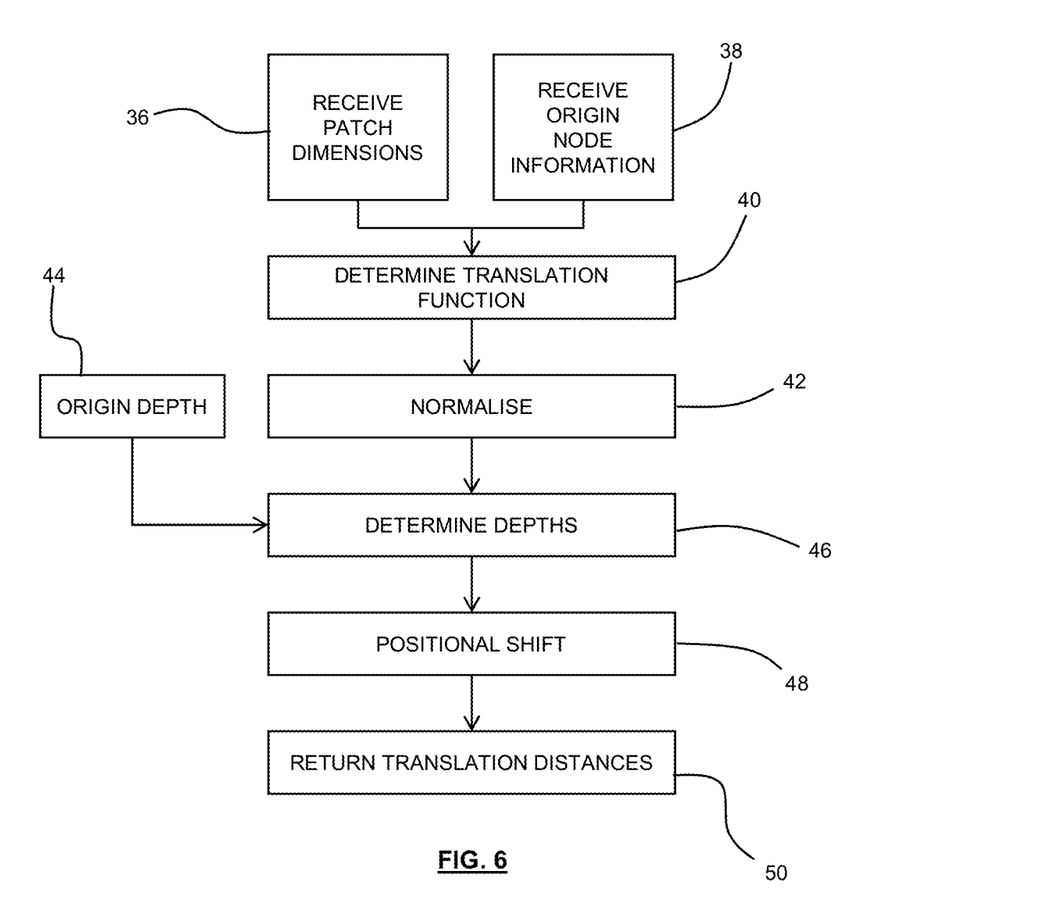
FIG. 6 is a flow chart illustrating a method for determining translation distances.

A process for determining the translation distances of the nodes 32 is illustrated in FIG. 6. The process may be performed by e.g. a translation engine of a processor. At step 36 the translation engine receives the dimensions of the patch 30. In the present case, those dimensions are in the form of the number of nodes 32 (i.e. 11 nodes) across the width of the patch 30 and the number of nodes 32 (i.e. 8 nodes) across the length of the patch 30. The engine also receives information 38 identifying an origin node 52 that is selected from the nodes 32 of the patch 30.

The origin node 52 can be determined (i.e. selected) in a number of ways. In general, the origin node is selected so as to be disposed in a region of the patch 30 that is aligned with a central portion of the defect 24. One way in which to determine the origin node is to identify the node 32 that has the greatest deviation (i.e. greatest distance) from the defect region 26. Another way to determine the origin node is to determine the deviation between each node 32 in the patch 30 and the corresponding point in the defect region 26 and then use those deviation measurements to determine the "centre of mass" of the defect. The node located closest to the mean of the distribution of deviations then becomes the origin node 52.

Figure 7:
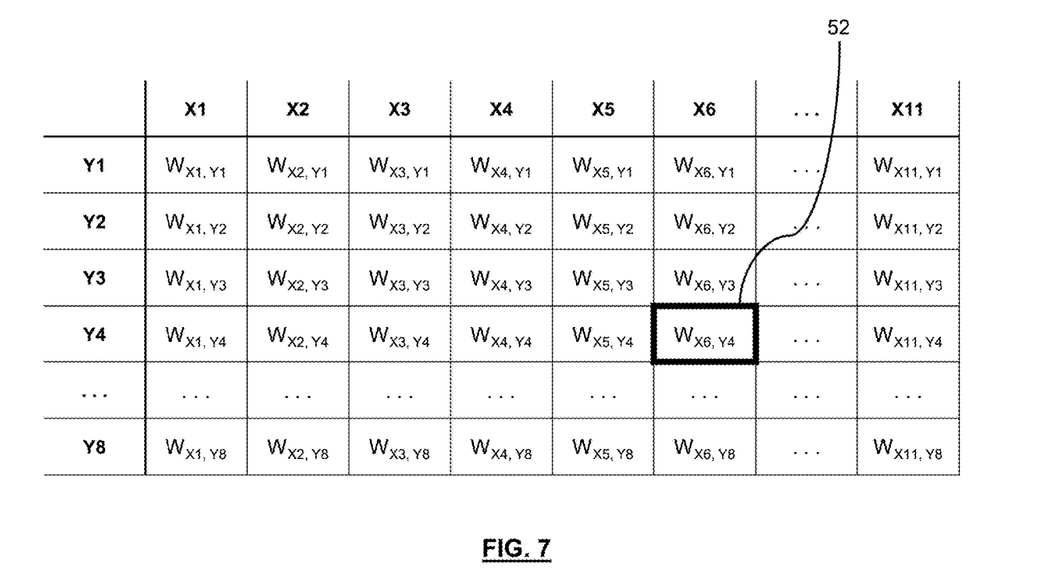
FIG. 7 is a table illustrating weighting values for determining translation distances.

The patch dimensions and the origin node information are used as inputs by the translation engine, at step 40, in a weighting function for determining weightings for each node 32 of the patch 30. One example of such a function is a two-dimensional Gaussian function (with the origin node information providing the origin of the function). FIG. 7 provides an exemplary results table that is illustrative of how such a calculation can be applied to the 11×8 patch with the origin node 52 being the X6/Y4 node (bold outline). Each cell of the table represents a node of the patch and contains a weighting ($W_{Xn, Yn}$) associated with that node. The origin node has the largest weighting ($W_{Xn, Yn}$), and the weightings reduce with distance (i.e. in number of cells) from the origin node in accordance with the Gaussian function. Thus, the lowest weightings are at the corner cells of the table.

Figure 8:
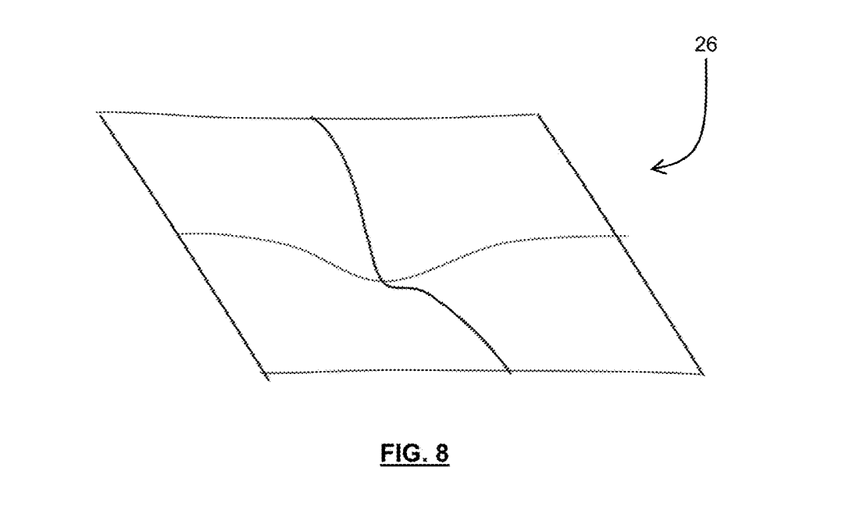
FIG. 8 is the defect region of FIG. 3 after a machining process has been performed.

As the weightings are calculated using a Gaussian function, the relationship between the weighting and the distance from the origin node 52 is not a linear relationship. Thus, the rate of change in weighting with respect to distance is greater for cells at mid-points between the patch edge and the origin node (e.g. X3/Y3, X3/Y2, X4/Y2; etc.) than the for cells at the edge of the patch (e.g. X1/Y4, X1/Y3, X2/Y1, etc.). This creates a tool path having a smooth transition between depths (as illustrated in FIG. 8).

Returning to FIG. 6, at step 42 the calculated weightings are normalised (i.e. such that the origin node 52 has a normalised weighting of 1 and the remaining weightings are between values of 0 and 1).

At step 44, a depth value of the origin node 52 (i.e. the distance/deviation of the origin node from the defect region) is provided to the translation engine. At step 46 a depth factor is applied to the depth value of the origin node in order to determine an origin translation distance. This depth factor acts to increase the depth value, which provides the distance A discussed with reference to FIG. 5. The normalised weightings of each node 32 are then combined (e.g. multiplied) with the origin translation distance, which provides translation distances for each of the nodes 32.

Optionally, at step 48, the translation distances of each node 32 may be shifted by a fixed value. Specifically, the translation distance of each node 32 may be decreased by a fixed amount. In physical terms, this shifts the patch 30 in an upwards direction. The distance of this shift is limited such that the origin node remains above the surface of the transformed patch, thus ensuring that the defect will be completely smoothed out by the machining process. This shift may accommodate minor deviations (e.g. due to tolerances) in alignment between the turbine blade 22 and a machining tool used for machining the turbine blade 22. Such alignment issues could (without the application of the offset) result in a sharp edge being formed at the periphery of the patch 30 (where, for example, the misalignment would result in cutting the surface deeper than the provided translation distances).

In a final step (step 50), the translation engine returns the calculated translation distances for each node. As is discussed above, these translation distances are used in order to transform the patch 30 to generate the machining path for repairing the defect region of the turbine blade 22.

As is mentioned above, the machining path generated by the transformed patch 30 is used to machine the defect region 26 of the turbine blade 22 so as to remove the defect in the turbine blade 22. The machined defect region 26 is shown schematically in FIG. 8.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of machining a surface of a component, the method comprising:
   scanning the surface of the component to obtain scanned electronic 3D data representing the scanned surface of the component;
   locating a surface defect of the scanned surface and identifying a defect region that surrounds and includes the surface defect;
   providing electronic 3D data representing a patch having the desired shape of the defect region and comprising a plurality of nodes;
   transforming the patch to generate a tooling path for repairing the surface defect, transforming the patch comprising translating the plurality of nodes of the patch, the translation distance of each node being based on the distance of that node from an origin node of the patch;
   determining a weighting for each node using a two-dimensional Gaussian function, the weighting indicative of a translation distance of that node relative to the translation distance of the origin node; and
   machining the surface of the component according to the generated tooling path.

2. The method according to claim 1, wherein the transformation of the patch is performed such that, for each node, the further the node is from the origin node, the smaller the translation distance is for that node.

3. The method according to claim 1, wherein the relationship between the translation distance and the distance from the origin node is a non-linear relationship.

4. The method according to claim 1, wherein the patch is extracted from data representing the component as designed.

5. The method according to claim 1, wherein the nodes of the patch are arranged in a grid.

6. The method according to claim 1, wherein the size of the patch is at least partly determined based on the depth of the defect.

7. The method according to claim 1, further comprising selecting the origin node from the plurality of nodes of the patch by comparing the patch with the defect region.

8. The method according to claim 1, further comprising aligning the patch with the scanned surface by selecting a plurality of alignment nodes of the plurality of nodes of the patch and minimising the distance of the alignment nodes with the defect region.

9. The method according to claim 8, wherein the alignment nodes are spaced from the centre of the patch.

10. The method according to claim 1, wherein the step of locating the defect comprises inspecting the scanned surface for areas having a curvature above a predetermined threshold curvature.

11. The method according to claim 1, wherein each node is translated in a direction that is normal to the surface of the patch at the location of the node.

12. The method according to claim 1, wherein the component is an aerofoil.

13. The method according to claim 12, wherein the scanned surface is a gas-washed surface of the aerofoil.

14. An aerofoil having an aerodynamic surface machined according to claim 1.

15. A gas turbine engine comprising an aerofoil according to claim 14.

* * * * *